(12) United States Patent
Okada et al.

(10) Patent No.: US 9,568,128 B2
(45) Date of Patent: Feb. 14, 2017

(54) PIPING CONNECTION DEVICE AND HEAT PUMP CYCLE DEVICE HAVING SAME

(71) Applicant: DENSO CORPORATION, Kariya, Aichi-pref. (JP)

(72) Inventors: Kei Okada, Kariya (JP); Terukazu Higuchi, Okazaki (JP); Shinichi Naganuma, Takahama (JP); Yoshinori Yanagimachi, Takahama (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 234 days.

(21) Appl. No.: 14/408,896

(22) PCT Filed: Jun. 11, 2013

(86) PCT No.: PCT/JP2013/003658
§ 371 (c)(1),
(2) Date: Dec. 17, 2014

(87) PCT Pub. No.: WO2013/190803
PCT Pub. Date: Dec. 27, 2013

(65) Prior Publication Data
US 2015/0300544 A1 Oct. 22, 2015

(30) Foreign Application Priority Data

Jun. 22, 2012 (JP) ................................ 2012-141197
May 24, 2013 (JP) ................................ 2013-110165

(51) Int. Cl.
*F16L 55/00* (2006.01)
*F16L 21/08* (2006.01)
(Continued)

(52) U.S. Cl.
CPC ............ *F16L 21/08* (2013.01); *B60H 1/00571* (2013.01); *F16L 19/00* (2013.01); *F16L 21/04* (2013.01);
(Continued)

(58) Field of Classification Search
USPC ......... 285/206, 13, 14, 123.3, 924, 208, 205
See application file for complete search history.

(56) References Cited

U.S. PATENT DOCUMENTS 3,485,516 A * 12/1969 Kell ........................ F16L 23/12
285/123.1
3,948,315 A * 4/1976 Powell ...................... F28D 7/06
165/143

(Continued)

FOREIGN PATENT DOCUMENTS

JP   2001004251 A   1/2001
JP   2005042815 A   2/2005
(Continued)

OTHER PUBLICATIONS

International Search Report and Written Opinion (in Japanese with English Translation) for PCT/JP2013/003658, mailed Aug. 6, 2013; ISA/JP.

*Primary Examiner* — Aaron Dunwoody
(74) *Attorney, Agent, or Firm* — Harness, Dickey & Pierce, P.L.C.

(57) ABSTRACT

A piping connection device includes a female block member fixed integrally with a male block member, and a first pipe is inserted into the female block member. The piping connection device further includes a drain passage through which a part of an outer peripheral surface of the first pipe communicates with an outer surface of the female block (Continued)

member. The drain passage is disposed in a portion higher in heat capacity than the other portions in the female block member.

10 Claims, 8 Drawing Sheets

(51) Int. Cl.
  *F16L 23/00*    (2006.01)
  *F16L 23/032*   (2006.01)
  *F16L 41/08*    (2006.01)
  *B60H 1/00*    (2006.01)
  *F16L 21/04*    (2006.01)
  *F16L 23/036*   (2006.01)
  *F16L 19/00*    (2006.01)
  *E03B 7/12*    (2006.01)

(52) U.S. Cl.
  CPC ............ *F16L 23/003* (2013.01); *F16L 23/032* (2013.01); *F16L 23/036* (2013.01); *F16L 41/086* (2013.01); *E03B 7/12* (2013.01); *F16L 2201/40* (2013.01)

(56) References Cited

U.S. PATENT DOCUMENTS

| | | | |
|---|---|---|---|
| 6,145,890 A * | 11/2000 | Hiestand | B23Q 1/0027 285/13 |
| 6,443,502 B1 | 9/2002 | Iida et al. | |
| 6,908,117 B1 * | 6/2005 | Pickett, Jr. | F16L 41/086 285/137.11 |
| 7,300,075 B2 * | 11/2007 | Ebskamp | G01F 15/185 137/454.6 |
| 7,971,910 B2 * | 7/2011 | Holt | F16L 39/00 285/13 |
| 2005/0023828 A1 | 2/2005 | Takeuchi et al. | |
| 2008/0258459 A1 | 10/2008 | Fujiwara et al. | |

FOREIGN PATENT DOCUMENTS

| | | |
|---|---|---|
| JP | 2005147320 A | 6/2005 |
| JP | 2009257741 A | 11/2009 |
| JP | 2012047371 A | 3/2012 |
| WO | WO-2007015434 A1 | 2/2007 |

* cited by examiner

FIG. 1

→ FLOW IN HEATING
---> FLOW IN COOLING
—·→ FLOW IN DEHUMIDIFICATION

PIPING CONNECTION DEVICE AND HEAT PUMP CYCLE DEVICE HAVING SAME

CROSS REFERENCE TO RELATED APPLICATIONS

This application is a U.S. National Phase Application under 35 U.S.C. 371 of International Application No. PCT/JP2013/003658 filed on Jun. 11, 2013 and published in Japanese as WO 2013/190803 A1 on Dec. 27, 2013. This application is based on and claims the benefit of priority from Japanese Patent Applications No. 2012-141197 filed on Jun. 22, 2012, and No. 2013-110165 filed on May 24, 2013. The entire disclosures of all of the above applications are incorporated herein by reference.

TECHNICAL FIELD

The present disclosure relates to a piping connection device that connects block members to which pipes are connected, and a heat pump cycle device having the piping connection device.

BACKGROUND ART

A pipe connecting structure known up to now couples two pipes together by connecting a block member, to which one pipe is fixed, to a block member, to which another pipe is fixed, by a fastening device.

PRIOR ART DOCUMENT

Patent Document

Patent Document 1: JP 2009-257741 A
Patent Document 2: JP 2012-47371 A

SUMMARY OF THE INVENTION

However, in the above pipe connecting structure, moisture entering and adhering between those members may be cooled and frozen, and those members may be damaged by volume expansion of ice. As a related art that copes with freezing, techniques disclosed in, for example, Patent Document 1 and Patent Document 2 have been known. According to Patent Document 1, in a refrigeration cycle, if a given condition is satisfied, an exterior heat exchanger switches to an operating state functioning as a radiator, to thereby limit frosting of the exterior heat exchanger. Also, according to Patent Document 2, in a solenoid valve integrated expansion valve, a heat transfer member that transfers a heat generated in an electromagnetic coil of an electromagnetic valve to a valve main body is provided to limit the freezing of a valve main body surface.

The present disclosure has been made in view of the above, and an object of the present disclosure is to provide a piping connection device that can limit a damage to members which is caused by freezing of water entering between the members, and a heat pump cycle device having the piping connection device.

According to an aspect of the present disclosure, a piping connection device connects a first pipe and a second pipe through which a fluid is capable of flowing. The piping connection device includes a female block member into which the first pipe is inserted to be supported, a male block member into which the second pipe is inserted to be supported and including an internal passage through which the fluid is capable of flowing, and a cylindrical male protrusion, and a connector that fixes the female block member and the male block member in a state where an end surface of the female block member is in close contact with an end surface of the male block member. The first pipe communicates with the second pipe through an internal passage of the male block member, and the cylindrical male protrusion is inserted into the first pipe. An axial center of the connector is located apart from axial centers of the first pipe and the second pipe. The female block member includes a drain passage through which a part of an outer peripheral surface of the inserted first pipe communicates with an outer surface of the female block member.

According to the above configuration, for example, water generated in a gap between the female block member and the first pipe can be escaped to the drain passage, and discharged from the gap. With the above configuration, deforming or damaging of the respective portions can be limited. The deforming or damaging is caused by a fact that the water generated in the gap between the female block member and the first pipe is frozen with a reduction in fluid temperature, and subjected to volume expansion to push out the gap, or caused by repetition of the freezing. With the above configuration, according to the present disclosure, the piping connection device can be provided, which is capable of limiting the damage to the members caused by freezing water penetrated between the members.

The drain passage is provided in a portion of the female block member other than a portion smallest in heat capacity. According to the above configuration, the portion in which the drain passage is provided is higher in the heat capacity in the female block member. For that reason, when the fluid temperature is lowered, the female block member is frozen in order of heat capacity from low to high. The drain passage is hardly cooled in the female block member, and a speed of the temperature decrease is slow. For that reason, even if water escaped from the gap between the female block member and the first pipe dwells in the drain passage, the freeze of dwelling water is delayed or dwelling water is not frozen. Thus, the damage to the member can be limited. With the above configuration, according to the present disclosure, the piping connection device can be provided, which is capable of limiting the damage to the members caused by freezing water penetrated between the members.

EMBODIMENTS FOR EXPLOITATION OF THE INVENTION

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A piping connection device according to the present disclosure is configured to connect respective pipes into which fluid flows to each other. The respective pipes are fixed in a state where the respective pipes are inserted into block members each presenting a lump of a given shape, and those two block members are combined together in a given state, and fixed, as a result of which the pipes internally communicate with each other so that the fluid smoothly flows in the pipes. The fluid that flows in the pipe can be lowered in temperature according to operating conditions or use environments such as water, refrigerant, or various gases. For example, if the fluid is refrigerant, the piping connection device according to the present disclosure is used as a device that connects respective refrigerant pipes used in a cycle in which the refrigerant flows, such as a refrigerator vehicle, a vehicle air conditioning system, or a water heater.

A first embodiment which is one embodiment of the present disclosure will be described with reference to FIGS. 1 to 5. In the first embodiment, a description will be given of a case in which the piping connection device according to the present disclosure is applied to a heat pump cycle device 100 for a vehicle air conditioning system as one of applied examples.

Figure 1:
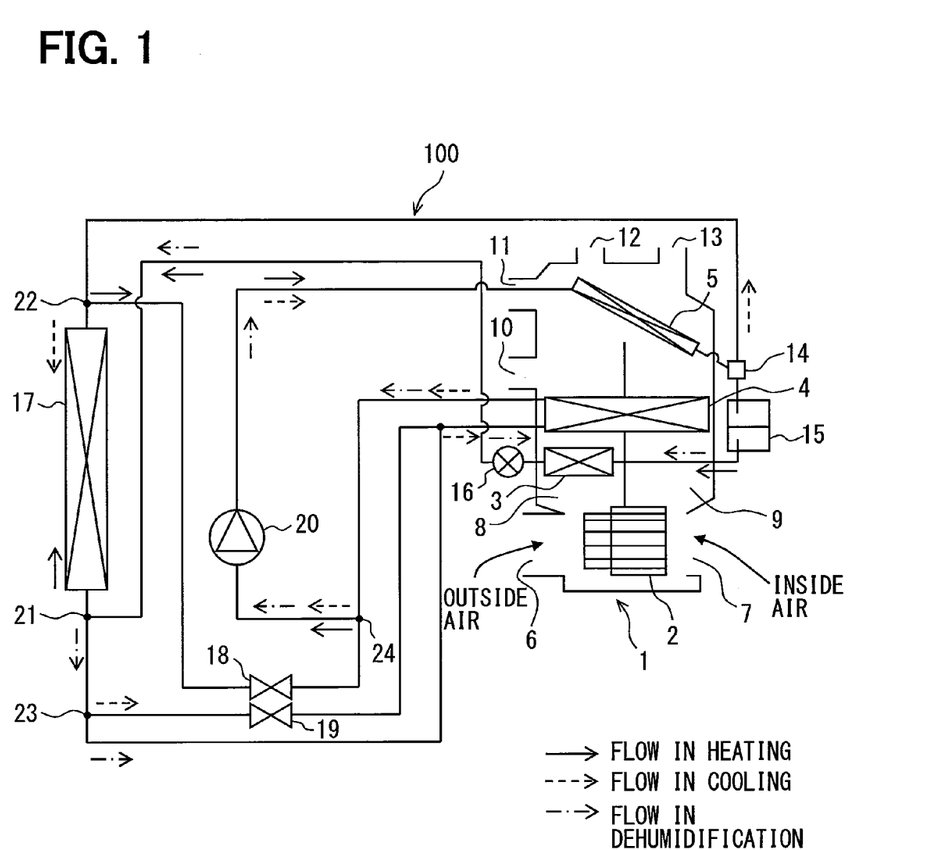
FIG. 1 is a schematic diagram illustrating a heat pump cycle device capable of using a piping connection device according to the present disclosure.

As illustrated in FIG. 1, a vehicle air conditioning system includes the heat pump cycle device 100 installed in hybrid vehicles or electric vehicles. An air conditioning unit case 1 is disposed on a rear side of an instrument panel in front of a vehicle interior. The air conditioning unit case 1 has an outside air inlet 6 and an inside air inlet 7 formed on one side, and a defroster outlet port 10, a face outlet port 11, a foot outlet port 12, and a rear foot outlet port 13, which are plural outlet ports into the vehicle interior, formed on the other side.

The outside air inlet 6 and the inside air inlet 7 are switchably opened and closed by an inside/outside air switching door (not shown). The defroster outlet port 10, the face outlet port 11, the foot outlet port 12, and the rear foot outlet port 13 are connected to a vehicle interior space through respective outlet ducts (not shown). The air conditioning unit case 1 includes an inside/outside air switching box (not shown) having the inside/outside air switching door, and a blower 2 having a suction portion connected to the outside air inlet 6 and the inside air inlet 7.

An outlet port of the blower 2 is connected to a downstream ventilation passage extending in a centrifugal direction of a multi-blade centrifugal fan. The ventilation passage includes an outside air ventilation passage 8 in which an outside air introduced from the outside air inlet 6 due to the suction force of the blower 2 flows, and an inside air ventilation passage 9 in which an inside air introduced from the inside air inlet 7 due to the suction force of the blower 2 flows.

Hereinafter, a description will be given of respective functional components configuring the heat pump cycle device 100. The respective functional components are connected to each other by the refrigerant pipes, and exert given functions due to switching operation of the refrigerant paths. A subcooler 3, an evaporator 4, and a condenser 5 are arranged in the stated order from an upstream side toward a downstream side within the air conditioning unit case 1 on a downstream side of the blower 2 in a blown air. The subcooler 3 is arranged on an upstream side of the evaporator 4 in the blown air so that at least a heat transfer unit of the subcooler 3 is located in only the outside air ventilation passage 8. The subcooler 3 is disposed for the purpose of ensuring subcool (degree of subcooling) in a heating operation, or a dehumidification mode, and functions as a heat exchanger that dehumidifies and heats an outside air that flows in the outside air ventilation passage 8 due to a radiation action of a solution refrigerant that flows from a receiver 15 in the heating mode or the dehumidification mode.

The evaporator 4 is arranged to intersect with both of the outside air ventilation passage 8 and the inside air ventilation passage 9 within the air conditioning unit case 1 on the downstream side of the subcooler 3 in the blown air. Hence, the evaporator 4 functions as a cooling heat exchanger that dehumidifies and cools the blown air flowing in the outside air ventilation passage 8 and the inside air ventilation passage 9 due to a heat absorbing action of the refrigerant which flows within the evaporator 4 in the cooling mode or the dehumidification mode.

The condenser 5 is arranged to intersect with both of the outside air ventilation passage 8 and the inside air ventilation passage 9 in the ventilation passage within the air conditioning unit case 1 close to the above plural outlet ports. The condenser 5 functions as a heating heat exchanger that heats the blown air flowing in the outside air ventilation passage 8 and the inside air ventilation passage 9 due to a heat radiation action of the refrigerant that flows within the condenser 5 in a heating mode, the dehumidification mode, and the cooling mode.

A first ventilation passage switching door (not shown in FIG. 1) that switches between a ventilation passage that passes through the condenser 5, and a ventilation passage that bypasses the condenser 5 is disposed in the ventilation passage downstream of the evaporator 4 and upstream of the condenser 5. The air-conditioned air that has flowed through the outside air ventilation passage 8 or the inside air ventilation passage 9 arrives at a downstream outlet port through any one of a route that is heated while passing through the condenser 5, or a route that is not heated while bypassing the condenser 5, which is opened by the first ventilation passage switching door.

A second ventilation passage switching door (not shown in FIG. 1) that switches between the operation of partitioning the outside air ventilation passage 8 and the inside air ventilation passage 9, and the operation of communicating the outside air ventilation passage 8 with the inside air ventilation passage 9 is disposed in the ventilation passage downstream of the condenser 5. The air-conditioned air that has flowed through the outside air ventilation passage 8 or the inside air ventilation passage 9 is blown into the vehicle interior through any one of a route that leads to the defroster outlet port 10 or the face outlet port 11, and a route that leads to the foot outlet port 12 and the rear foot outlet port 13, which is opened by the second ventilation passage switching door.

As described above, the heat pump cycle device 100 can conduct cooling, heating, and dehumidification by the aid of the cooling evaporator 4 and the heating condenser 5. Components of the heat pump cycle device 100 are a compressor 20 that sucks and discharges the refrigerant, the condenser 5, the receiver 15, the subcooler 3, an expansion valve 16, an exterior heat exchanger 17, and a solenoid valve 18, and those components are connected to each other by the refrigerant pipes into an annular shape to configure a refrigeration cycle.

The condenser 5 exchanges heat between the refrigerant discharged from the compressor 20 and air to heat the air in the heating mode. The receiver 15 allows the refrigerant to flow therein from the condenser 5 to conduct vapor-liquid separation in the heating mode. The subcooler 3 exchanges heat between the liquid refrigerant that flows into the subcooler 3 from the receiver 15, and an outside air from the outside air ventilation passage 8 to subcool the liquid refrigerant in the heating mode. The expansion valve 16 is a decompression device that decompresses the refrigerant subcooled by the subcooler 3 in the heating mode. The exterior heat exchanger 17 evaporates the refrigerant decompressed by the expansion valve 16 in the heating mode. The solenoid valve 18 is disposed to control a refrigerant flow from the exterior heat exchanger 17 to the compressor 20.

Further, the heat pump cycle device 100 is equipped with a route in which the refrigerant decompressed by the expansion valve 16 is sucked into the compressor 20 after having flowed into the evaporator 4 without flowing into the exterior heat exchanger 17 in the dehumidification mode. In the above route, the refrigerant flows into the expansion valve 16, a branch portion 21, a branch portion 23, the evaporator 4, a branch portion 24, and the compressor 20 in the stated order. Also, the refrigerant subjected to heat exchange with the blown air by the condenser 5 flows into the exterior heat exchanger 17 without flowing into the receiver 15 by a three-way valve 14 disposed on the downstream side of the condenser 5, and flows into the evaporator 4 through a flow channel opened by a solenoid valve 19 in the cooling mode. A route in which the refrigerant is then sucked into the compressor 20 is disposed in the heat pump cycle device 100. In the above route, the refrigerant flows into the three-way valve 14, a branch portion 22, the exterior heat exchanger 17, the branch portion 21, the solenoid valve 19, the evaporator 4, the branch portion 24, and the compressor 20 in the stated order.

The exterior heat exchanger 17 is arranged in a vehicle exterior of the vehicle, and exchanges heat between the outside air forcedly blown by an outdoor fan, and the refrigerant. The expansion valve 16 is a fixed type expansion valve. The expansion valve 16 may be configured by a mechanical expansion valve, and in this case, a temperature operating system is applied which includes a temperature sensing tube, feeds back an outlet refrigerant temperature so that an evaporation state of the refrigerant at an outlet of the exterior heat exchanger 17 has an appropriate degree of superheat, and controls a flow rate of the refrigerant by an appropriate valve opening. The compressor 20 is an electric compressor that is applied with an AC voltage whose frequency is adjusted by an inverter to control a rotating speed of a motor thereof. The inverter is supplied with a DC power supply from an in-vehicle battery, and controlled by a control device.

The control device receives sensor signals from an outside air temperature sensor, an evaporator temperature sensor, a discharge temperature sensor of the compressor 20, and a refrigerant temperature sensor at the outlet of the exterior heat exchanger 17 (not shown). Also, the control device receives a signal based on setting information on a passenger through an air-conditioning control panel installed in the instrument panel.

Subsequently, a description will be given of the actions of the respective operation modes (cooling mode, heating mode, dehumidification mode) of the vehicle air-conditioning device with the above configuration. A flow of the refrigerant in the cooling mode is indicated by dashed arrows in FIG. 1. The high-temperature high-pressure gas refrigerant discharged from the compressor 20 flows into the condenser 5, heat of the refrigerant is drawn by surrounding air when passing through the condenser 5 to cool the gas refrigerant. However, because a blowing mode is face blowout, a blowing rate of the air passing around the condenser 5 is low, and a cooling degree is not large. Then, the refrigerant passes through the branch portion 22 by the three-way valve 14 that closes a flow channel on the receiver 15 side to flow into the exterior heat exchanger 17, and heat of the refrigerant is drawn by the air blown by the outdoor fan when passing through the exterior heat exchanger 17, and the refrigerant is cooled into a mist-like refrigerant. Thereafter, the mist-like refrigerant passes through the solenoid valve 19 to flow into the evaporator 4, absorbs heat from the blown air in the ventilation passage within the air conditioning unit case 1 so as to be evaporated within the evaporator 4, and is sucked into the compressor 20 after passing through the branch portion 24. The cold air cooled by heat absorption in the evaporator 4 further advances to the ventilation passage, and is blown out toward an upper body of the passenger from mainly the face outlet port 11 to cool the vehicle interior.

Subsequently, a description will be given of a flow of refrigerant when the heating mode is conducted. The flow of refrigerant in the heating mode is indicated by solid arrows in FIG. 1, and the high-temperature high-pressure gas refrigerant discharged from the compressor 20 flows into the condenser 5, and heat is drawn from the gas refrigerant by the surrounding blown air when passing through the condenser 5 to cool and condense the refrigerant. Then, the refrigerant flows into the receiver 15 by the three-way valve 14 that opens the flow channel on the receiver 15 side, and is separated into a gas refrigerant and a liquid refrigerant in the receiver 15. The receiver 15 is disposed between the condenser 5 and the subcooler 3, and accumulates an excessive refrigerant in correspondence with the amount of refrigerant that changes according to a vehicle load variation or the like to conduct the vapor-liquid separation. Also, the receiver 15 can surely ensure the subcooling, and contributes to an increase in the amount of absorbed heat.

Then, the liquid refrigerant that flows out of the receiver 15 flows into the subcooler 3, and is again cooled by a low-temperature outside air in winter season which flows in the outside air ventilation passage 8 when passing through the subcooler 3, and sufficiently subcooled. The high-temperature refrigerant that flows out of the subcooler 3 flows into the expansion valve 16, and is decompressed by the expansion valve 16 to such a refrigerant pressure that the evaporation state of the refrigerant at the outlet of the exterior heat exchanger 17 has an appropriate degree of superheat. Also, if the expansion valve 16 is a fixed throttle valve, the refrigerant is decompressed to a given low pressure. As described above, the refrigerant decompressed to the low pressured by the expansion valve 16 passes through the branch portion 21 to flow into the exterior heat exchanger 17, and absorbs heat from the air blown from the outdoor fan when passing through the exterior heat exchanger 17, and is evaporated. The gas refrigerant evaporated by the exterior heat exchanger 17 passes through the solenoid valve 18 by way of the branch portion 22, and is sucked into the compressor 20 via the branch portion 24.

The outside air heated by the subcooler 3 advances to a route that passes through the condenser 5 opened by the above first ventilation passage switching door, and is further heated by the condenser 5 into a warm air. Then, when a defroster outlet mode of the heating operation is conducted, the warm air passes through the condenser 5, and thereafter passes through the route led to the defroster outlet port 10 opened by the second ventilation passage switching door, and is blown out toward an inner surface of a front window. Also, when a foot outlet mode of the heating operation is conducted, after the warm air has passed through the condenser 5, both of a route led to the foot outlet port 12 and the rear foot outlet port 13, and a route led to the defroster outlet port 10 are opened by the second ventilation passage switching door, and the warm air is blown out toward the feet of the passenger through those routes, and also blown out toward the inner surface of the front window.

Subsequently, a description will be given of a flow of refrigerant when the dehumidification mode is conducted. In the dehumidification mode, the refrigerant flows into the subcooler 3, the evaporator 4, and the condenser 5. After the blown air within the air conditioning unit case 1 has been first heated by the subcooler 3, the blown air is cooled and dehumidified by the evaporator 4, and thereafter again heated by the condenser 5 into a warm air. The warm air is mainly blown out toward the inner surface of the front window from the defroster outlet port 10 to exert the anti-fog effect, and also dehumidify and heat the vehicle interior.

The flow of refrigerant in the dehumidification mode is indicated by dashed arrows in FIG. 1, and the high-temperature high-pressure gas refrigerant discharged from the compressor 20 flows into the condenser 5, and heat is drawn from the gas refrigerant by the surrounding blown air when passing through the condenser 5 to cool and condense the refrigerant. Then, the refrigerant flows into the receiver 15 by the three-way valve 14 that opens the flow channel on the receiver 15 side, and is separated into a gas refrigerant and a liquid refrigerant in the receiver 15. In the receiver 15, the subcooling is surely ensured. Then, the liquid refrigerant that flows out of the receiver 15 flows into the subcooler 3, and is again cooled by a low-temperature outside air in winter season which flows in the outside air ventilation passage 8 when passing through the subcooler 3, and sufficiently subcooled, as in the heating mode.

The high-temperature refrigerant that flows out of the subcooler 3 flows into the expansion valve 16, and is decompressed by the expansion valve 16 to such a refrigerant pressure that the evaporation state of the refrigerant at the outlet of the exterior heat exchanger 17 has an appropriate degree of superheat. Also, if the expansion valve 16 is a fixed throttle valve, the refrigerant is decompressed to a given low pressure. In this way, the refrigerant decompressed by the expansion valve 16 to a low pressure arrives at the branch portion 21, and passes through the branch portion 23 to flow into the evaporator 4 without flowing into the exterior heat exchanger 17. Then, the refrigerant absorbs heat from the blown air in the ventilation passage within the air conditioning unit case 1, and is evaporated within the evaporator 4, and passes through the branch portion 24 so as to be sucked into the compressor 20.

The outside air heated by the subcooler 3 is cooled and dehumidified by heat absorption in the evaporator 4, and further advances to the ventilation passage, and is again heated by the condenser 5 into a warm air. After the warm air has passed through the condenser 5, the warm air passes through the route led to the defroster outlet port 10 opened by the second ventilation passage switching door, and is blown out toward an inner surface of the front window.

Figure 2:
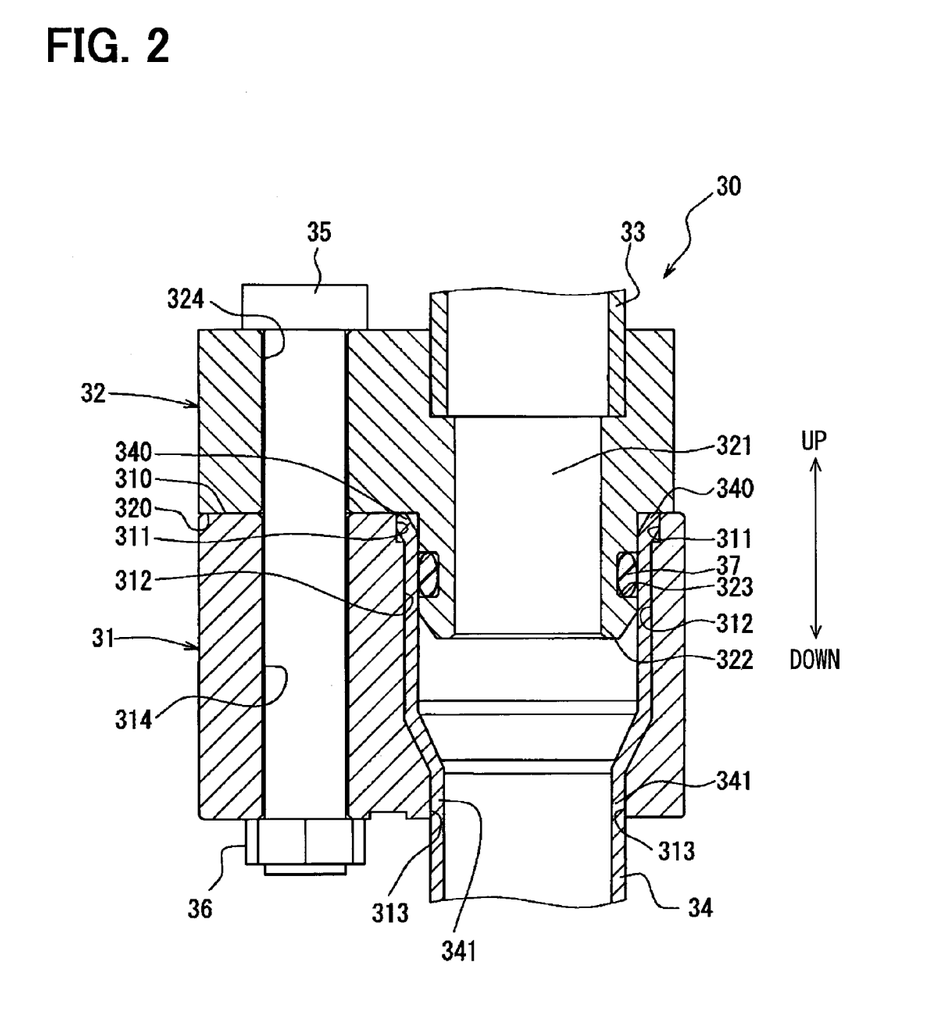
FIG. 2 is a schematic sectional view illustrating the piping connection device according to a first embodiment of the present disclosure.
Figure 3:
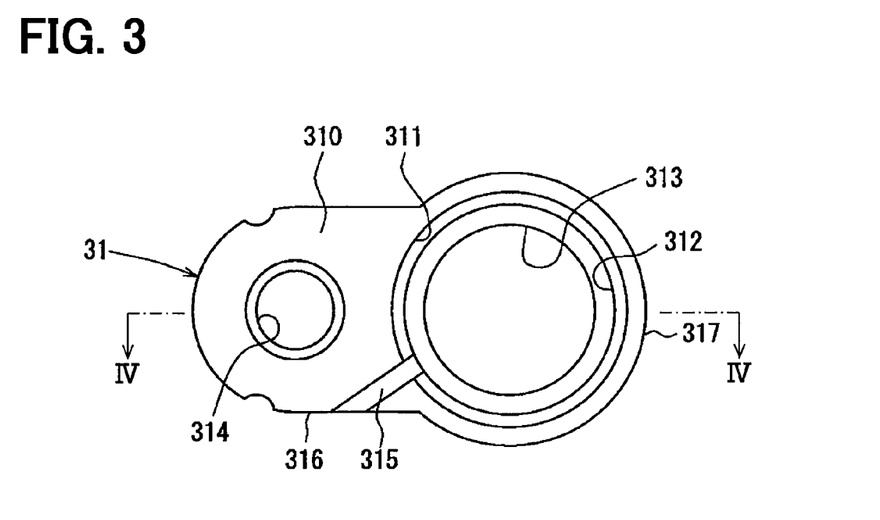
FIG. 3 is a top view of a female block member in the piping connection device according to the first embodiment.
Figure 4:
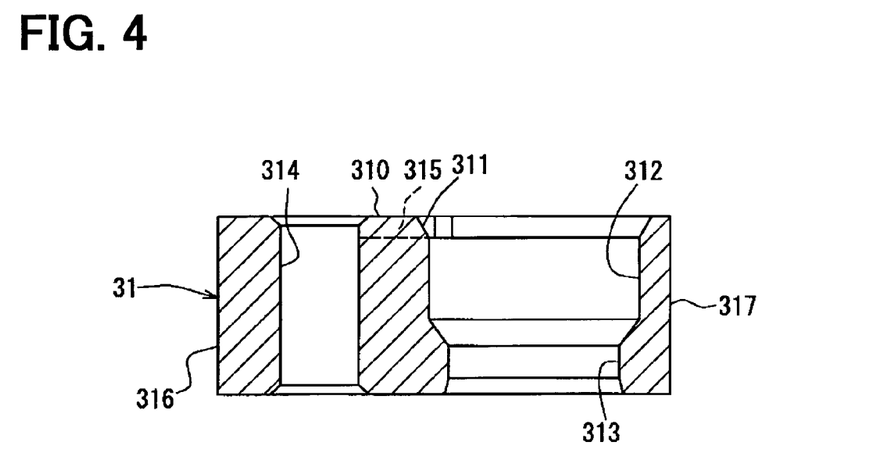
FIG. 4 is a sectional view taken along a line IV-IV of FIG. 3.

Subsequently, a description will be given of a piping connection device 30. As illustrated in FIG. 2, the piping connection device 30 includes a female block member 31, a male block member 32, and a bolt 35 and a nut 36 which exemplify a connector that fixes the male block member 32 and the female block member 31. As illustrated in FIGS. 2 to 4, the female block member 31 is a lump member having a given length in a thickness direction thereof where a through-hole for installing a pipe therein is formed on one side, and a through-hole 314 for insertion of the bolt for fixing integrally with the male block member 32 is formed on the other side. The through-hole for pipe installation continuously includes a tip hole portion 311 and a large-diameter hole portion 312 formed closer to an end surface 310 that comes in contact with an end surface 320 of the male block member 32, and a small-diameter hole portion 313 formed closer to an end surface of the opposite side. The tip hole portion 311 is slightly larger than the large-diameter hole portion 312.

As illustrated in FIG. 3, the female block member 31 has a laterally asymmetrical shape in a plan view in axial directions of those through-holes. The above shape of the female block member 31 is also called, for example, "pot-bellied shape". In the female block member 31, one outer surface 317 shaped to surround the through-hole (through-hole including the large-diameter hole portion 312 and the small-diameter hole portion 313) for pipe installation, and the other outer surface 316 shaped to surround the through-hole 314 for bolt insertion are different in shape from each other. One outer surface 317 and the other outer surface 316 form a continuous outer surface, and form a contour of the female block member 31. One outer surface 317 is circular. The other outer surface 316 is an outer peripheral surface on the fastening portion side, and track-shaped. Also, one outer surface 317 is larger in diameter in a plan view, but equal in thickness in the axial direction (vertical direction in FIG. 4)

to the other outer surface 316. Further, a thickness that is a distance between one outer surface 317 and the large-diameter hole portion 312 is thinner than a thickness that is a distance between other outer surface 316 and the through-hole 314 for bolt insertion.

The female block member 31 has a first pipe 34 supported in a state where the first pipe 34 is inserted into the through-hole for bolt insertion. The first pipe 34 forms an internal passage of the female block member 31 in which fluid flows. The first pipe 34 is designed to form a tip flared portion 340 shaped along the tip hole portion 311, a large-diameter portion shaped along the large-diameter hole portion 312, and a small-diameter pipe portion 341 shaped along the small-diameter hole portion 313 from a tip portion of the first pipe 34. The first pipe 34 is inserted into the female block member 31 in a state where the first pipe 34 comes in contact with the through-hole for pipe installation. The first pipe 34 is coupled with the female block member 31 in this state by brazing or caulking, and fixed integrally with the female block member 31.

The female block member 31 can be configured to include a drain passage 315 through which the internal passage located an inside of the large-diameter hole portion 312 communicates with the other outer surface 316. Therefore, the drain passage 315 can be configured such that a part of the outer peripheral surface of the inserted first pipe 34 communicates with the other outer surface 316 of the female block member 31. The drain passage 315 is a groove portion formed in the end surface 310 to continuously extend from the large-diameter hole portion 312 to the other outer surface 316. Therefore, water penetrating to the inner surface of the large-diameter hole portion 312 or the tip hole portion 311 reaches the other outer surface 316 through the drain passage 315, and can be discharged to the external.

The female block member 31 is entirely made of, for example, the same material, and can be made of metal (for example, aluminum, aluminum alloy), or resin (for example, nylon resin, polypropylene resin, epoxy resin, polyester resin). In other words, the material of the female block member 31 is even as a whole. Therefore, a portion of the other through-hole 314 side is thicker, and therefore larger in heat capacity than the portion of one large-diameter hole portion 312 side. That is, the drain passage 315 is disposed in a portion larger in the heat capacity than the other potion smallest in the heat capacity in the female block member 31. The portion larger in the heat capacity where the drain passage 315 is formed is an area 131 indicated by a meshed portion in FIG. 5. An area 231 around the tip hole portion 311 or the large-diameter hole portion 312 other than the area 131 is a portion in which the drain passage 315 is not formed in the female block member 31.

The male block member 32 is a lump member having a given length in a thickness direction thereof where a through-hole in which the pipe can be installed, and an internal passage is configured is formed on one side, and a through-hole 324 for bolt insertion for fixing integrally with the female block member 31 is formed on the other side. The through-hole on one side continuously includes an internal passage 321 formed closer to the end surface 320 that comes in contact with the end surface 310 of the female block member 31, and a pipe installation portion formed closer to the end surface on the opposite side, and in which the second pipe 33 is inserted.

As with the female block member 31, the male block member 32 has a laterally asymmetrical shape in a plan view in axial directions of those through-holes. The above shape of the male block member 32 is also called, for example, "potbellied shape". The male block member 32 is identical in the contour viewed in a plan view with the above-mentioned female block member 31. When the male block member 32 is fixed integrally with the female block member 31, the male block member 32 includes a male protrusion 322 inscribed in the large diameter portion of the first pipe 34 fitted into the large-diameter hole portion 312. The male protrusion 322 is a cylindrical portion in which the internal passage 321 where the fluid flows is formed inside of the male protrusion 322, and protrudes outward from the end surface 320 of the male block member 32. In this way, the male block member 32 includes the second pipe 33 that is supported in an inserted state and communicates with the first pipe 34, the internal passage 321 that communicates with the internal passage of the female block member 31, and the cylindrical male protrusion 322.

Further, an annular groove portion 323 is formed in the overall circumference of the male protrusion 322. An O-ring 37 is fitted into the annular groove portion 323. The O-ring 37 is elastically deformed while being pressed from an inner wall surface of the first pipe 34 in a state where the male protrusion 322 is inserted into the first pipe 34, to thereby conduct sealing so as to prevent fluid from being leaked from the internal passage of the pipe to the external. The connector fixes the male block member 32 to the female block member 31 so as to press the male block member 32 and the female block member 31 against each other by the fastening structure of the bolt 35 and the nut 36 in a state where the male protrusion 322 is inserted into the first pipe 34, and the respective end surfaces 310 and 320 are brought into close contact with each other. As illustrated in FIGS. 2 and 3, the connector is disposed so that an axial center of the connector is spaced apart from the axial centers of the first pipe 34 and the second pipe 33. Also, in addition to a structure in which the bolt 35 inserted through the female block member 31 and the male block member 32 is fastened with the nut 36 from the outside, one of the female block member 31 and the male block member 32 may be internally threaded, and a screw inserted from the other block member may be engaged with the internal thread of one block member for fastening.

The operational advantages of the piping connection device 30 according to the first embodiment will be described. The piping connection device 30 includes the female block member 31, the male block member 32, and the connector that fixes the male block member 32 to the female block member 31. The female block member 31 includes an internal passage in which the fluid flows with the provision of the first pipe 34 supported in the inserted state. The male block member 32 includes the second pipe 33 that is supported in the inserted state and communicates with the first pipe 34, the internal passage that communicates with the internal passage of the female block member 31, and the cylindrical male protrusion 322. The connector fixes the male block member 32 and the female block member 31 which are combined together in a state where the cylindrical male protrusion 322 is inserted into the first pipe 34, and the respective end surfaces 310 and 320 are brought into close contact with each other.

The female block member 31 includes the drain passage 315 formed so that a part of the outer peripheral surface of the inserted first pipe 34 communicates with the outer surface of the female block member 31. The drain passage 315 is formed in an arbitrary place of the female block member 31. The drain passage 315 is capable of providing the operational advantages described below if a part of the outer peripheral surface of the first pipe 34 communicates with the outer surface of the female block member 31 in the female block member 31.

For example, water that penetrates to a gap slightly generated in a contact portion between the female block member 31 and the first pipe 34 due to dew condensation of the female block member 31 is frozen with a reduction in fluid temperature, and subjected to volume expansion. As a result, the gap is pushed out, and freezing is repeated, to thereby induce deformation of the respective members, and finally lead to damage to the members (for example, freeze cracking).

Under the circumstances, according to the above configuration, water melted from a frozen state can be escaped to the external through the drain passage 315. Since the penetrated water can be thus appropriately discharged without continuing to dwell, the growth of freeze can be limited in a subsequent freezable situation. Therefore, according to the piping connection device 30, the member damage caused by freezing of water penetrated between the members is limited.

Figure 5:
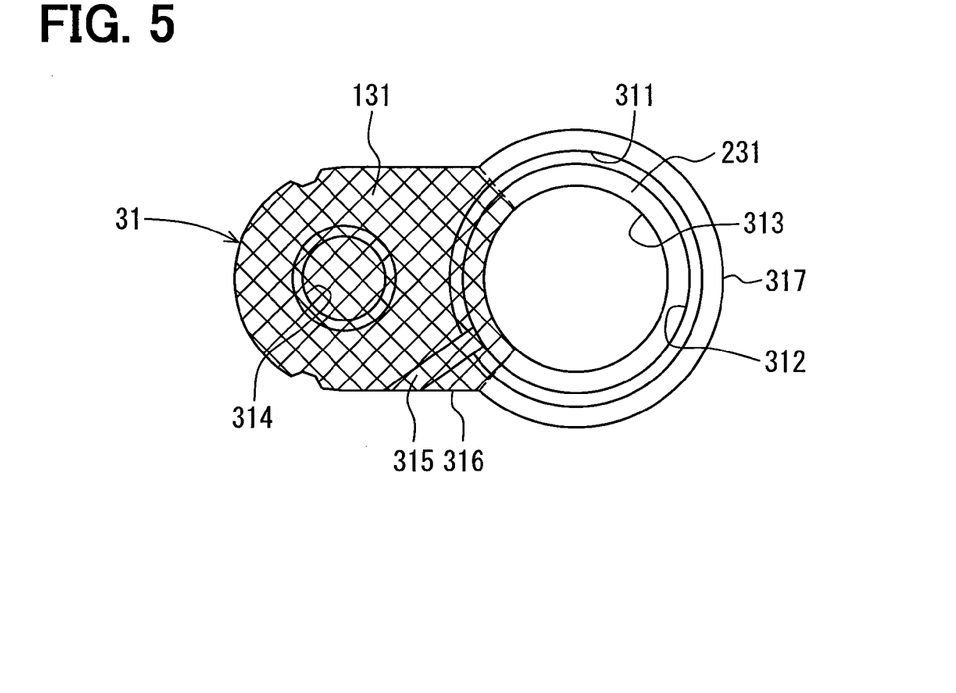
FIG. 5 is a top view illustrating a placement area of a drain passage in the female block member according to the first embodiment.

Also, the drain passage 315 is disposed in the area 131 set to be larger in the heat capacity than the other potion smallest in the heat capacity in the female block member 31.

Since the portion in which the drain passage 315 is formed is thus larger in the heat capacity in the female block member 31, the portion is hardly heated and cooled as compared with the other portion. Therefore, when the fluid temperature decreases, the female block member 31 is frozen in order from the portion small in the heat capacity to the portion high in the heat capacity. The drain passage 315 is hardly cooled in the female block member 31, and becomes lower in the speed of temperature decrease. For that reason, even if water escaped from the gap between the female block member 31 and the first pipe 34 dwells in the drain passage 315, since the freezing of dwelling water is delayed, the damage to the member can be limited. Also, freezing in the drain passage 315 forming a drain route is delayed, or water is not frozen, thereby being capable of avoiding the iteration of freezing in the gap.

Also, the drain passage 315 of the piping connection device 30 is formed in the female block member 31 that has not yet been fixed integrally with the male block member 32, in advance. According to the above configuration, the device can be surely provided which can predict the shape and the size of the drain passage 315, and the portion led to the outer peripheral surface of the first pipe 34, in a state where the male block member 32 and the female block member 31 are fixed integrally, and can exhibit a desired drain capacity.

Also, the female block member 31 is entirely made of the same material. The drain passage 315 is provided in the area 131 (portion) set to be longer in distance between the outer peripheral surface of the first pipe 34 and the outer surface 316 of the female block member 31, and be larger in the thickness than the other portion smallest in the thickness, in the female block member 31.

According to the above configuration, since the area 131 is a portion larger in the heat capacity in the female block member 31, if the temperature of flowing fluid decreases, the area 131 is a cold late portion that is hardly cooled and lower in the speed of temperature decrease in the female block member 31. Therefore, in the drain passage 315 formed in the area 131, freezing is delayed even if the dwelling water is present. For that reason, water escaped to the drain passage 315 from the other portion shorter in the distance between the outer peripheral surface of the first pipe 34 and the other outer surface 316 is not rapidly frozen, and a grace period for drawing water to the external can be ensured. With the above configuration, the drain to the external can be more surely implemented.

Also, the piping connection device 30 is used to connect the respective refrigerant pipes in which the refrigerant flows to each other in the heat pump cycle device 100 used as vehicle air-conditioning using the refrigerant operation.

According to the above configuration, in the heat pump cycle device 100, the refrigerant at very low temperature frequently flows within the refrigerant pipes. Also, the refrigerant at high temperature may flow to heat the refrigerant pipe depending on the operation mode. For that reason, moisture is repetitively penetrated to the gap between the members configuring the piping connection device 30 due to dew condensation, or frozen. The piping connection device 30 drains the water penetrated to the gap between the members to the external under the status in which the above phenomenon is repetitively generated. For that reason, the freezing between the members can be prevented extensively without being limited to the installation place. Therefore, according to the piping connection device 30 applied to the heat pump cycle device 100, the limiting of the member crack or deformation by freezing can be effectively realized.

Also, it is preferable that the piping connection device 30 is a part of a passage forming the heat pump cycle device 100, and at least one piping connection device 30 is provided in a passage that couples a suction side of the compressor 20 with the evaporator 4. In the heat pump cycle device 100, the piping connection device 30 is disposed on the above position with the results that the pipe route most likely to be frozen can be effectively protected from the crack and deformation of the members caused by freezing.

Also, it is preferable that the piping connection device 30 is installed in a posture in which the male block member 32 and the female block member 31 are arranged vertically in the vertical direction (gravity direction) (refer to FIG. 2). According to this installation posture, even if the female block member 31 is installed in any direction, the drain passage 315 is installed at a presupposed given angle with respect to the vertical direction. That is, the female block member 31 is installed in a posture facing in a vertical direction to the axis of the pipe as far as this installation posture. For that reason, there is no case in which the male block member 32 and the female block member 31 are installed in a state where a height relationship between one end and the other end of the drain passage 315 is reversed by construction. Therefore, the dwelling water after the freeze generated on the first pipe 34 side is melted can be surely discharged through the drain passage 315 with the assumed discharge structure.

Also, it is preferable that the drain passage 315 is installed so that an opening portion in the outer surface of the female block member 31 is disposed at a position lower than an opening portion facing a part of the outer peripheral surface of the first pipe 34. According to the above installation posture of the drain passage 315, the structure can be provided in which the dwelling water after the freeze generated on the first pipe 34 side is melted is liable to be discharged through the drain passage 315 with the use of the gravity.

Second Embodiment

Figure 6:
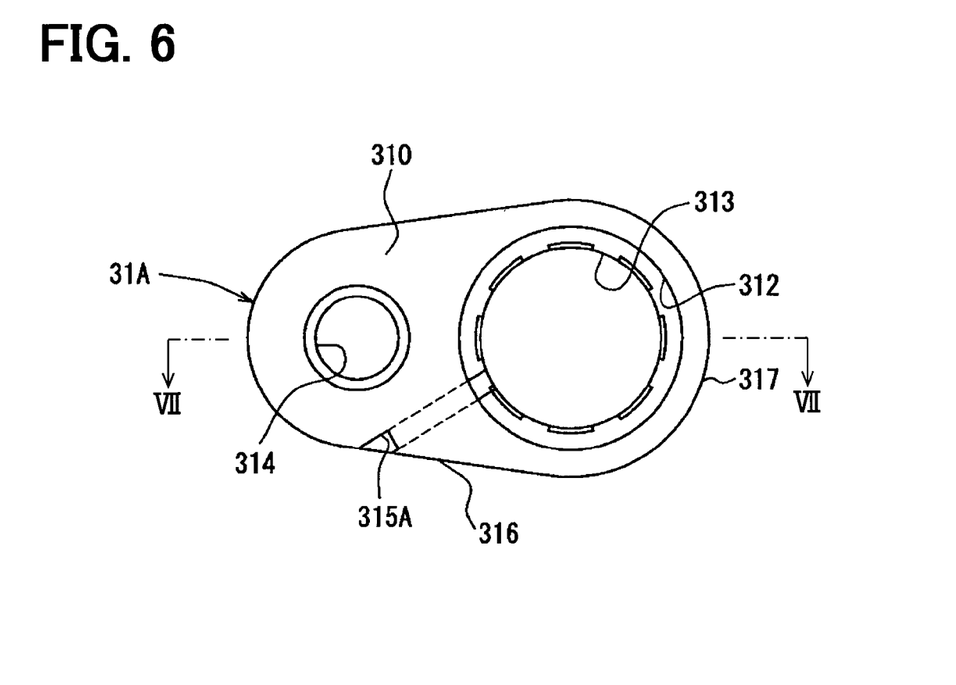
FIG. 6 is a top view of a female block member in a piping connection device according to a second embodiment of the present disclosure.
Figure 7:
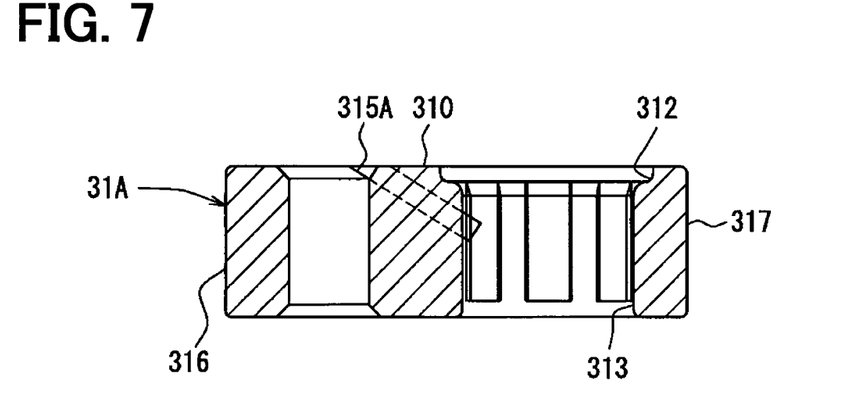
FIG. 7 is a sectional view taken along a line VII-VII of FIG. 6.
Figure 8:
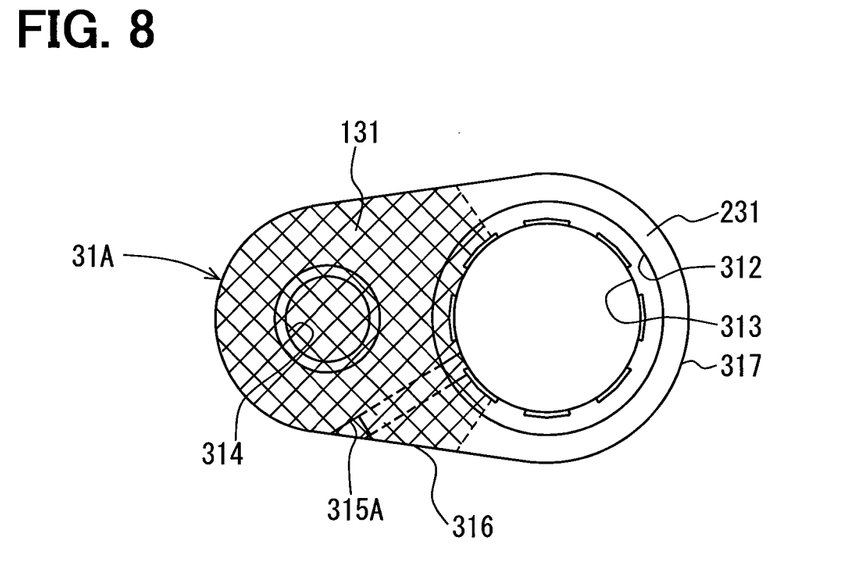
FIG. 8 is a top view illustrating a placement area of a drain passage in the female block member according to the second embodiment.

In a second embodiment, a piping connection device according to another configuration to the first embodiment will be described with reference to FIGS. 6 to 8. In FIGS. 6 to 8, components denoted by the same symbols as those referred to in the first embodiment represent identical components, and their operational advantages are also identical with those in the first embodiment. Hereinafter, a description will be given of a configuration, a processing procedure, and operation different from those in the first embodiment.

The piping connection device according to the second embodiment is characterized in a drain passage 315A formed in a female block member 31A. The drain passage 315A is a passage through which an internal passage located inside of the small-diameter hole portion 313 communicates with the other outer surface 316. Therefore, the drain passage 315A is a passage through which a part of the outer peripheral surface of the first pipe 34 communicates with the other outer surface 316 of the female block member 31A in a portion that comes in contact with the small-diameter hole portion 313. Also, the drain passage 315A is also a tunnel-shaped passage that penetrates through the female block member 31A from the small-diameter hole portion 313 to the other outer surface 316. Therefore, water that enters an inner surface of the small-diameter hole portion 313 can arrive at the other outer surface 316 through the drain passage 315A, and is discharged to the external. The small-diameter hole portion 313 of the female block member 31A is formed into a given shape in advance in order to fix the first pipe 34 by caulking.

Also, the drain passage 315A may be disposed in an arbitrary place in the female block member 31A as in the first embodiment.

Third Embodiment

In a third embodiment, a description will be given of another configuration in which the drain passages 315 and 315A described in the first and second embodiments described above are disposed in arbitrary places in the female block members 31 and 31A regardless of the above-mentioned area with reference to FIGS. 9 to 11. Hereinafter, a description will be given of the configuration and operation different from those in the above respective embodiments. Therefore, the configuration and operation not particularly described are identical with those described in the above respective embodiments.

A drain passage 415 has a passage transverse area, for example, a lower value of a passage diameter determined according to a position in a female block member 41. In other words, the passage transverse area of the drain passage 415 is set on the basis of a position of the drain passage 415 angularly displaced around the axial center of the first pipe 34 with a thinnest portion as a start position in the female block member 41. The feature of the drain passage 415 is obtained on the basis of the following verification.

Figure 11:
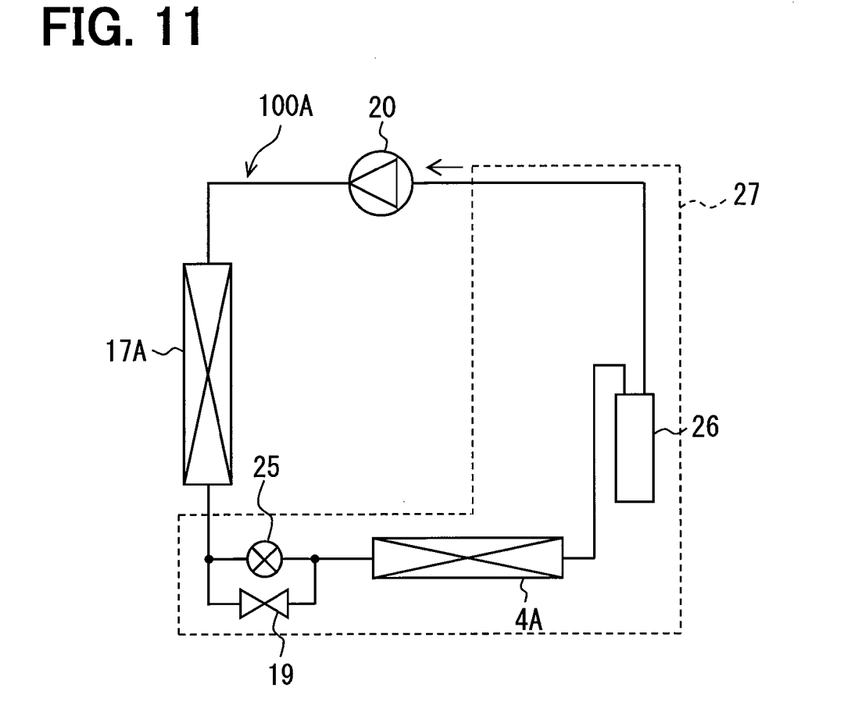
FIG. 11 is a schematic diagram illustrating a heat pump cycle device used in the evaluation of the drain passage according to the third embodiment.

In a test apparatus in which plural piping connection devices are installed at given positions in a heat pump cycle device 100A illustrated in FIG. 11, a test is implemented in a given condition, and pass or failure is determined in conformity to an evaluation criteria. The heat pump cycle device 100A includes a passage in which a compressor 20, a high pressure side heat exchanger 17A, an expansion valve 25, a low pressure side heat exchanger 4A, and an accumulator tank 26 are connected by pipes into an annular shape. Further, the heat pump cycle device 100A is equipped with a solenoid valve 19 that opens or closes a bypass passage through which an upstream portion of the expansion valve 25 communicates with a downstream portion thereof. The test is implemented in a state where the expansion valve 25, the low pressure side heat exchanger 4A, the accumulator tank 26, and the solenoid valve 19 are accommodated in the same vessel 27. Positions in which the piping connection devices are installed are a portion closer to an inlet of the accumulator tank 26, and a portion closer to an outlet thereof. That is, the piping connection devices are installed at least between the low pressure side heat exchanger 4A and the accumulator tank 26, and between the accumulator tank 26 and the compressor 20.

As the test conditions, an interior of the above vessel 27 is set at 25° C. and humidity of 90%, and water sufficiently adhere to the piping connection devices in advance. Under the conditions, in a state where the compressor 20 operates, heat pump operation and defrosting operation are alternately repeated by about 20000 times under control where a piping temperature varies in a range of from about −15° C. to about 15° C. Thereafter, visual evaluation is conducted.

The heat pump operation controls the solenoid valve 19 so as to close the bypass passage, and operates the compressor 20. The defrosting operation controls the solenoid valve 19 so as to fully open the bypass passage, and operates the compressor 20. In the visual evaluation, for example, if an abnormal deformation is generated in the female block member 41, it is determined as failure. Also, nitrogen gas or the like is injected and pressurized up to a given pressure within the pipe, and a subsequent pressure is detected. If the amount of leakage is large, it is determined as failure.

Figure 9:
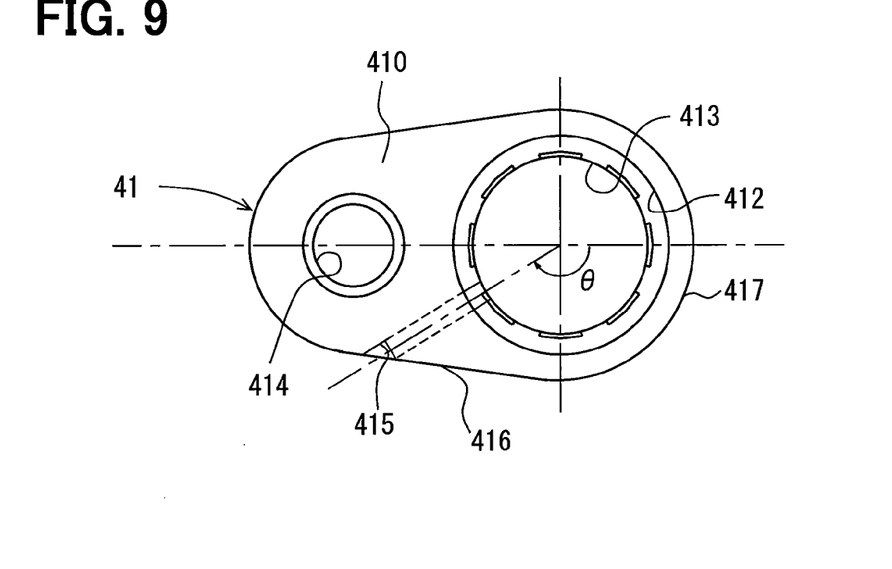
FIG. 9 is a top view of a female block member in a piping connection device according to a third embodiment of the present disclosure.
Figure 10:
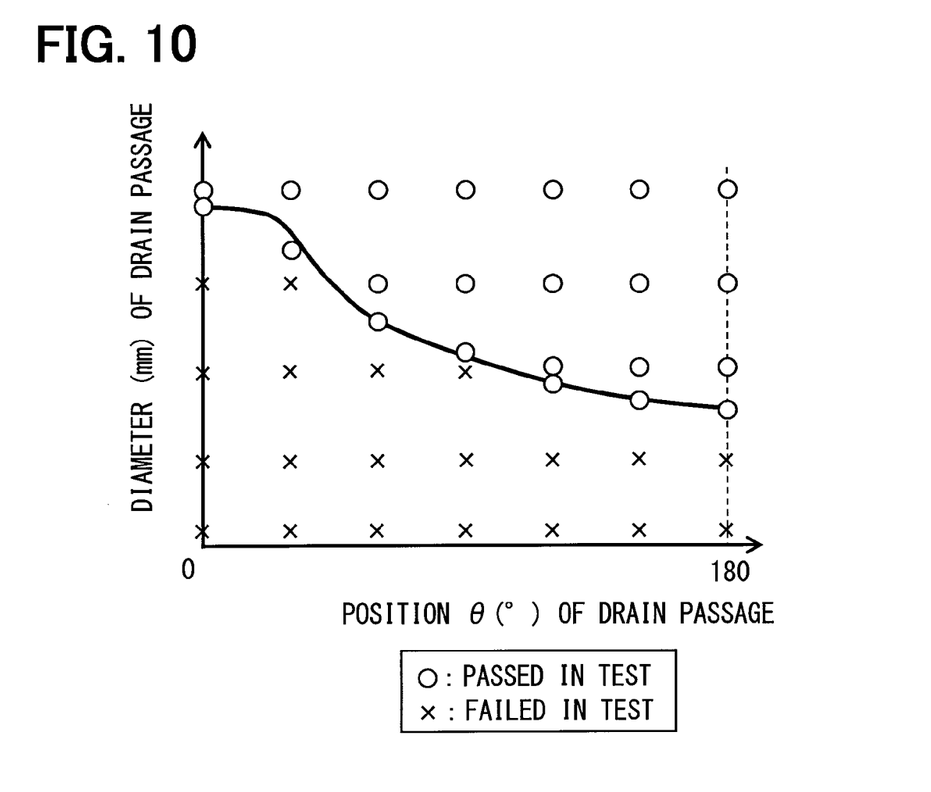
FIG. 10 is a diagram illustrating evaluation results with a change in position and diameter of a drain passage according to the third embodiment.

The determination results are illustrated in FIG. 10. Circles indicated in FIG. 10 represent pass determination, and crosses represent failure determination. A solid line illustrated in FIG. 10 can be drawn in a boundary between the circles and the crosses. According to the verification through the experiments, a lower limit line of the passage transverse area corresponding to the boundary between pass and failure is required between an angle θ of an angular displacement with the axis center of the first pipe 34 which is a cross point of dashed lines in FIG. 9 as a center, and the passage transverse area of the drain passage 415. Further, because the lower limit line is lowered more as θ increases more, the passage transverse area of the drain passage 415 can be more reduced in a thicker portion than a thinner portion.

It appears that the lower limit line of the passage transverse area is present according to a balance between a speed of drain and an expansion speed of water caused by freezing. Also, because a pressure of water when draining the drain passage 415 is relatively higher as the angle θ is smaller, there is a need to increase the drain speed. In order to increase the drain speed, it is preferable that a pressure loss at the time of draining is lower. Therefore, it is conceivable that the lower limit line of the passage transverse area become a larger value as the angle θ is smaller.

In this way, the passage transverse area of the drain passage 415 can be set in a range above a characteristic line connecting a first lower limit value set at a start position of θ=0°, and a second lower limit value at a position where θ increases from the start position by a given amount, which is a lower limit value larger than the first lower limit value. That is, the drain passage 415 can be set to an arbitrary value if a passage diameter is included in the range above the characteristic line of FIG. 9, and the drain passage 415 thus set obtains the above-mentioned anti-freezing effect. In the female block member 41 shaped as illustrated in FIG. 9, 8 can be set to an arbitrary angle in a range of from 0° to 180°.

Also, in the drain passage 415, because the lower limit value of the passage transverse area that obtains the operational advantages can be grasped according to the position as described above, a large drain passage can be prevented from being unintentionally set. Therefore, because the passage transverse area where the operational advantages can be predicted can be set, the piping connection device that prevents the strength and the sealability from being lowered can be provided.

Also, it is needless to say that the drain passage 415 can be replaced with the drain passage 315 of the first embodiment. That is, in the female block member 41, the drain passage may be configured by a groove portion formed in an end surface 410 so as to continuously extend from the large-diameter hole portion 312 to one outer surface 417 or the other outer surface 416.

Also, if the passage transverse area of the drain passage 415 changes from an inner surface side of the female block member 41 toward the outer surface side thereof, it is assumed that the passage transverse area called in the present specification is applied to the smallest passage transverse area in the drain passage. That is, in the passage having a non-constant passage transverse area, the passage transverse area of the smallest portion is set to the above lower limit line or higher.

Also, referring to FIG. 9, a through-hole 414 for bolt insertion corresponds to the above-mentioned through-hole 314, a large-diameter hole portion 412 corresponds to the above-mentioned large-diameter hole portion 312, and a small-diameter hole portion 413 corresponds to the above-mentioned small-diameter hole portion 313.

Fourth Embodiment

Figure 12:
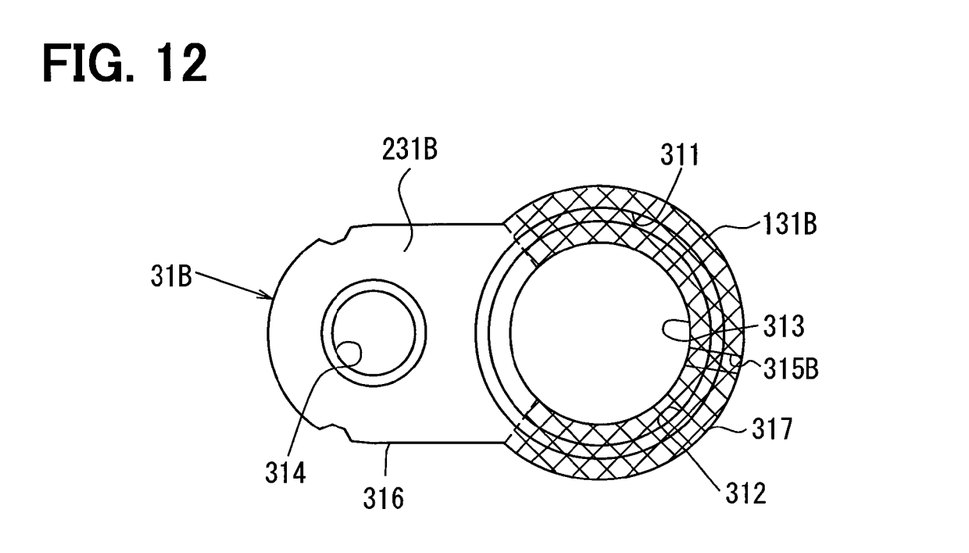
FIG. 12 is a top view illustrating a placement area of a drain passage in a female block member according to a fourth embodiment of the present disclosure.

In the fourth embodiment, a description will be described a piping connection device according to another configuration to the first embodiment with reference to FIG. 12. Referring to FIG. 12, components denoted by the same symbols as those referred to in the first embodiment represent identical components, and their operational advantages are also identical with those in the first embodiment. Hereinafter, a description will be given of a configuration, a processing procedure, and operation different from those in the first embodiment.

The piping connection device according to the fourth embodiment is characterized in a material of a female block member 31B. The female block member 31B is made of plural different materials, and the materials are different depending on the portions. In the female block member 31B, an area 131B indicated by a meshed portion in FIG. 12 is set to a portion larger in the heat capacity, and an area 231B set around the through-hole 314 other than the area 131B is a portion smaller in the heat capacity than the area 131B, and having no drain passage 315B. For example, the area 131B is made of a resin material, and the area 231B is made of a metal material smaller in the heat capacity than resin. In this way, the female block member 31B has the drain passage 315B in the area 131B larger in the heat capacity than the other portion. The drain passage 315B is a passage through which an internal passage located inside the large-diameter hole portion 312 or inside the small-diameter hole portion 313 communicates with one outer surface 317.

Fifth Embodiment

Figure 13:
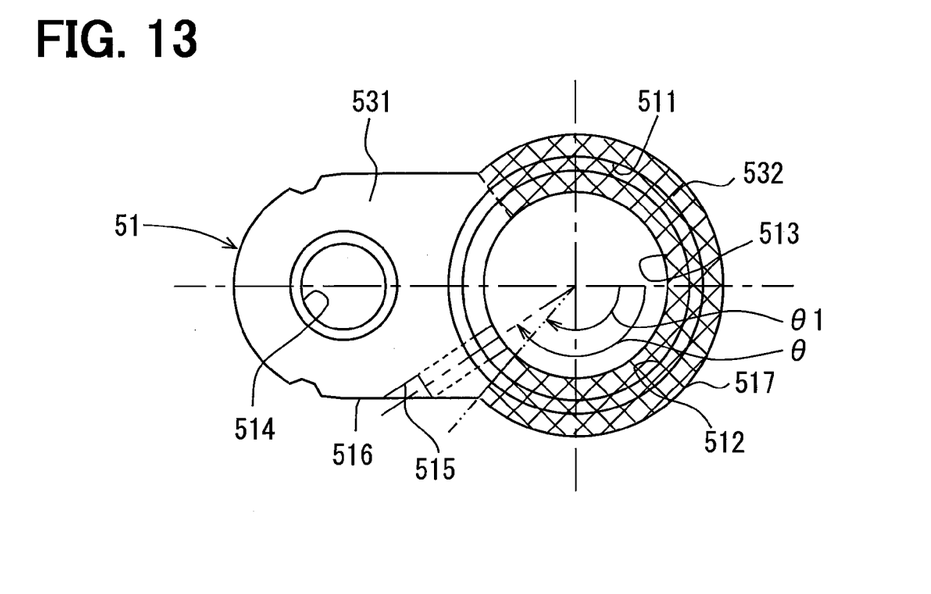
FIG. 13 is a top view of a female block member in a piping connection device according to a fifth embodiment of the present disclosure.

In a fifth embodiment, a description will be given of another configuration in which a drain passage 515 is disposed at an arbitrary place of a female block member 51 regardless of the above-mentioned area with respect to the female block member 31B described in the fourth embodiment with reference to FIGS. 13 and 14. Hereinafter, a description will be given of the configuration and operation different from those in the above-described embodiments. Therefore, the configuration and operation not particularly described are identical with those described in the above-described embodiments.

The female block member 51 is characterized in a material of the female block member 51 as with the female block member 31B. The female block member 51 is made of plural different materials, and the materials are different depending on the portions. In the female block member 51, an area 532 indicated by a meshed portion in FIG. 13 is set to a portion larger in the heat capacity, and an area 531 set around a through-hole 514 other than the area 532 is smaller in the heat capacity than the area 532.

A drain passage 515 has a passage transverse area, for example, a lower limit value of a passage diameter determined according to a position in the female block member 51. In other words, the passage transverse area of the drain passage 515 is set on the basis of a position of the drain passage 515 angularly displaced around the axial center of the first pipe 34 with a portion as a start position in the female block member 51. The features of the drain passage 515 are obtained on the basis of the verification based on the test and evaluation as in the third embodiment.

Figure 14:
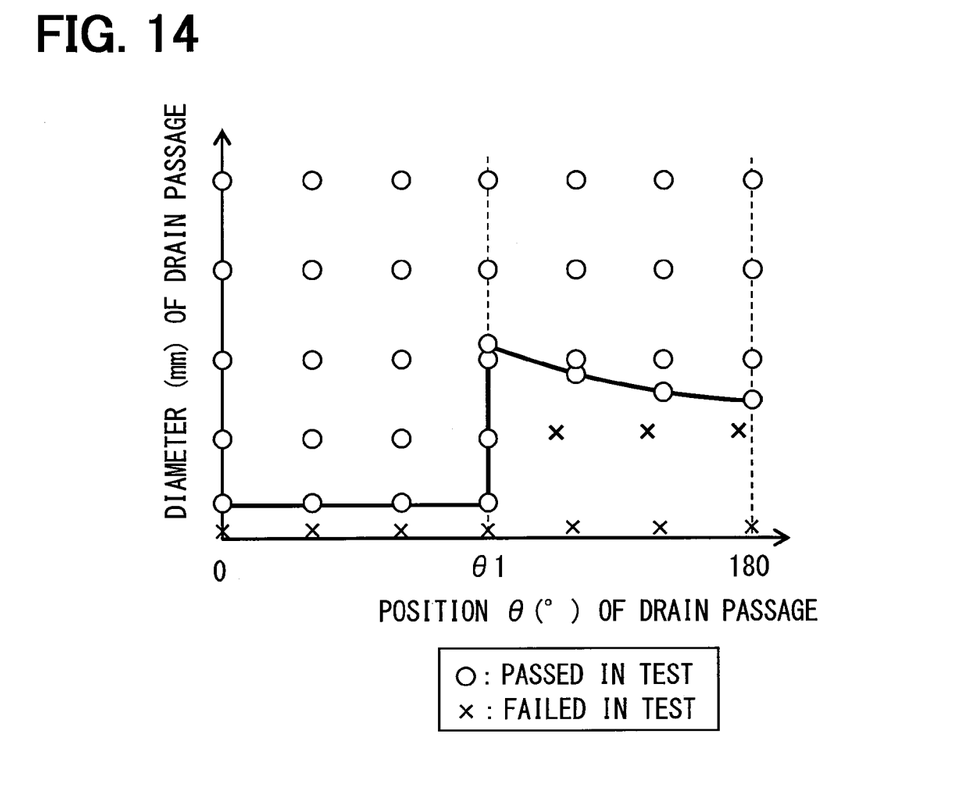
FIG. 14 is a diagram illustrating evaluation results with a change in position and diameter of a drain passage according to the fifth embodiment.

The determination results are illustrated in FIG. 14. Circles indicated in FIG. 14 represent pass determination, and crosses represent failure determination.

A solid line illustrated in FIG. 14 can be drawn in a boundary between the circles and the crosses. This solid line is a lower limit line of the passage transverse area corresponding to a boundary between pass and failure. Further, the lower limit line is a constant value when θ corresponding to the area 532 ranges from 0° to θ1. Further, the lower limit line becomes a value larger than the above constant value if exceeding θ1, and decreases more from that value as θ increases more. Therefore, the lower limit line is a small constant value in the area 532, and larger than the constant value in the area 532, in the area 531, and decreases more as θ increases more.

In this way, the passage transverse area of the drain passage 515 can be set to a range above the characteristic line illustrated in FIG. 14. That is, the drain passage 515 can be set to an arbitrary value if a passage diameter is included in the range above the characteristic line of FIG. 14, and the drain passage 515 thus set obtains the above-mentioned anti-freezing effect. In the female block member 51 shaped as illustrated in FIG. 14, θ can be set to an arbitrary angle in a range of from 0° to 180°.

Also, in the drain passage 515, because the lower limit value of the passage transverse area that obtains the operational advantages can be grasped according to the position as described above, a large drain passage can be prevented from being unintentionally set. Therefore, because the passage transverse area where the operational advantages can be predicted can be set, the piping connection device that prevents the strength and the sealability from being lowered can be provided.

Also, it is needless to say that the drain passage 515 can be replaced with the drain passage 315B of the fourth embodiment. That is, in the female block member 51, the drain passage may be configured by a groove portion formed in an end surface so as to continuously extend from the large-diameter hole portion 512 to one outer surface 517 or the other outer surface 516.

Also, in FIG. 14, a tip hole portion 511 corresponds to the above-mentioned tip hole portion 311, and a small-diameter hole portion 513 corresponds to the above-mentioned small-diameter hole portion 313.

Other Embodiments

The preferred embodiments of the present disclosure have been described in the above-described embodiments. However, the present disclosure is not limited to the above-mentioned embodiments, and can be variously deformed without departing from the spirit of the present disclosure. The structures of the above-described embodiments are merely exemplary, and technical scopes of the present disclosure are not limited to the disclosed scopes. The scope of the present disclosure is represented by the claims, and includes meanings equivalent to those of the claims, and all changes in the scope.

In the above-described embodiments, the drain passage is a passage formed in the female block member 31 in advance before the female block member 31 and the male block member 32 are assembled together, and a passage existing even in a resultant structure after assembling. The drain passage is not limited to that described in the above-described embodiments. For example, the drain passage is not formed in the female block member 31 in advance, and when the female block member 31 is fixed to the male block member 32, the female block member 31 or the like may be intentionally deformed into a passage formed in the resultant structure.

The heat pump cycle device 100 described in the above first embodiment is merely exemplary, and the heat pump cycle device that can be applied with the piping connection device of the present disclosure is not limited to the configuration and the action disclosed in the first embodiment.

In the above-described embodiment, the male protrusion 322 disposed in the male block member 32 is configured by a part of a solid portion forming the male block member 32, which is a cylindrical protrusion molded integrally with the end surface 320. However, the present invention is not limited to this configuration. For example, the male protrusion disposed in the male block member 32 may be configured by a tip portion of the second pipe 33 molded together with the second pipe 33. That is, the second pipe 33 is fixed to the male block member 32 in a state where the tip portion of the second pipe 33 protrudes from the end surface 320 in a shape such as the male protrusion.

In the above-described embodiment, a configuration may be applied in which a gasket made of metal or the like is interposed between the end surface 310 of the female block member 31 and the end surface 320 of the male block member 32 to seal mating faces of those members.

In the above-described embodiments, means for heating the male block member or the like may be further provided to melt the freeze.

What is claimed is:

1. A piping connection device that connects a first pipe and a second pipe, through which a fluid is capable of flowing, the piping connection device comprising:
a female block member into which the first pipe is inserted to be supported;
a male block member into which the second pipe is inserted to be supported, the male block member including an internal passage through which the fluid is capable of flowing, and a cylindrical male protrusion; and
a connector that fixes the female block member and the male block member in a state where an end surface of the female block member is in close contact with an end surface of the male block member, wherein
the first pipe communicates with the second pipe through an internal passage of the male block member,
the cylindrical male protrusion is inserted into the first pipe,
an axial center of the connector is located apart from axial centers of the first pipe and the second pipe, and
the female block member includes a drain passage through which a part of an outer peripheral surface of the inserted first pipe communicates with an outer surface of the female block member.

2. The piping connection device according to claim 1, wherein
the female block member is entirely made of uniform material, and
the drain passage is disposed in a portion of the female block member other than a portion smallest in thickness that is a distance between the outer peripheral surface of the first pipe and the outer surface of the female block member.

3. The piping connection device according to claim 1, wherein the drain passage comprises a groove portion provided on the end surface of the female block member that is in contact with the male block member.

4. The piping connection device according to claim 1, wherein the drain passage comprises a passage extending through the male block member so that the part of the outer peripheral surface of the first pipe communicates with the outer surface of the male block member.

5. The piping connection device according to claim 1, wherein the drain passage comprises a passage formed in the female block member in advance of the integrally fixing of the female block member to the male block member.

6. A heat pump cycle device used as a vehicle air conditioner using an action of a refrigerant, the heat pump cycle comprising the piping connection device according to claim 1 for connecting refrigerant pipes in which the refrigerant flows.

7. The heat pump cycle device according to claim 6, wherein at least one of the piping connection devices is disposed in a passage that connects a suction side of the compressor and an accumulator tank in the heat pump cycle device.

8. The heat pump cycle device according to claim 6, wherein the male block member is located on an upper side of the female block member in the piping connection device.

9. The piping connection device according to claim 1, wherein the drain passage is provided in a portion of the female block member other than a portion smallest in heat capacity.

10. The piping connection device according to claim 9, wherein
the female block member has a plurality of portions different in material, and
the drain passage is disposed in a portion of the female block member other than the portion made of a material smallest in the heat capacity in the female block member.

* * * * *